(12) United States Patent
Smith

(10) Patent No.: US 9,517,783 B2
(45) Date of Patent: Dec. 13, 2016

(54) MODIFICATION FOR A HAND TRUCK

(71) Applicant: Duck Pleights, LLC, Red Lion, PA (US)

(72) Inventor: David Paul Smith, Red Lion, PA (US)

(73) Assignee: DUCK PLEIGHTS, LLC, Red Lion, PA (US)

( * ) Notice: Subject to any disclaimer, the term of this patent is extended or adjusted under 35 U.S.C. 154(b) by 103 days.

(21) Appl. No.: 14/506,965

(22) Filed: Oct. 6, 2014

(65) Prior Publication Data

US 2016/0096541 A1  Apr. 7, 2016

(51) Int. Cl.
  *B62B 1/26* (2006.01)
  *B62B 1/14* (2006.01)
  *B62B 1/22* (2006.01)

(52) U.S. Cl.
  CPC . *B62B 1/26* (2013.01); *B62B 1/14* (2013.01); *B62B 1/22* (2013.01)

(58) Field of Classification Search
  USPC .............. 248/346.01, 346.03, 346.4, 346.5
  See application file for complete search history.

(56) References Cited

U.S. PATENT DOCUMENTS

| | | | | |
|---|---|---|---|---|
| 2,431,589 A | * | 11/1947 | Shuler, Jr. | B66F 9/12 108/55.3 |
| 4,182,531 A | * | 1/1980 | de Szegheo | B66F 9/187 294/90 |
| 8,141,830 B1 | * | 3/2012 | Hudson | E04G 21/1808 248/188 |

FOREIGN PATENT DOCUMENTS

FR  2464220 A1 *  3/1981 ............... B66F 9/19

* cited by examiner

*Primary Examiner* — Alfred J Wujciak
(74) *Attorney, Agent, or Firm* — The Marbury Law Group, PLLC

(57) ABSTRACT

Various embodiments provide for a bottom bracket coupled to a ledge of a hand truck and configured to engage/secure a heavy-duty tripod. In such embodiments, the bottom bracket may prevent the tripod from accidently slipping off of the ledge while the hand truck is in motion. The bottom bracket may include a front plate, a back plate, and a gap formed between the front plate and the back plate. A first portion of the gap may be configured to receive a first foot of the tripod, and a second portion of the gap may be configured to receive a second foot of the tripod. Once the feet are placed into the first and second portions of the gap, the tripod may be held firmly in place between the front plate and the second plate.

18 Claims, 14 Drawing Sheets

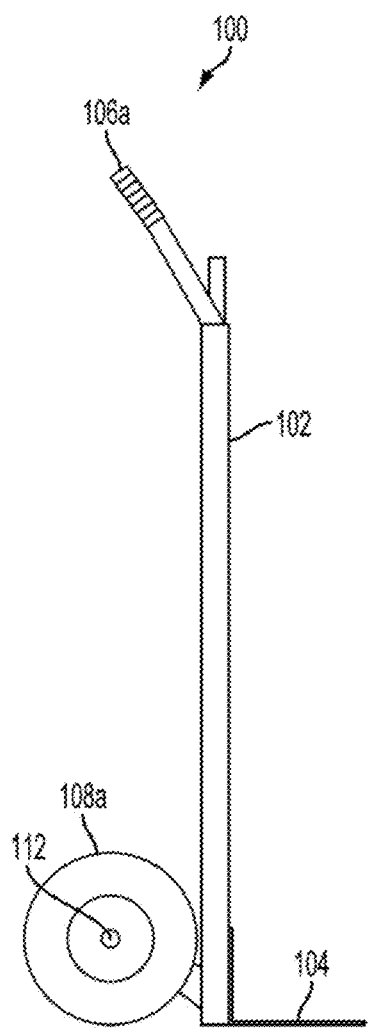
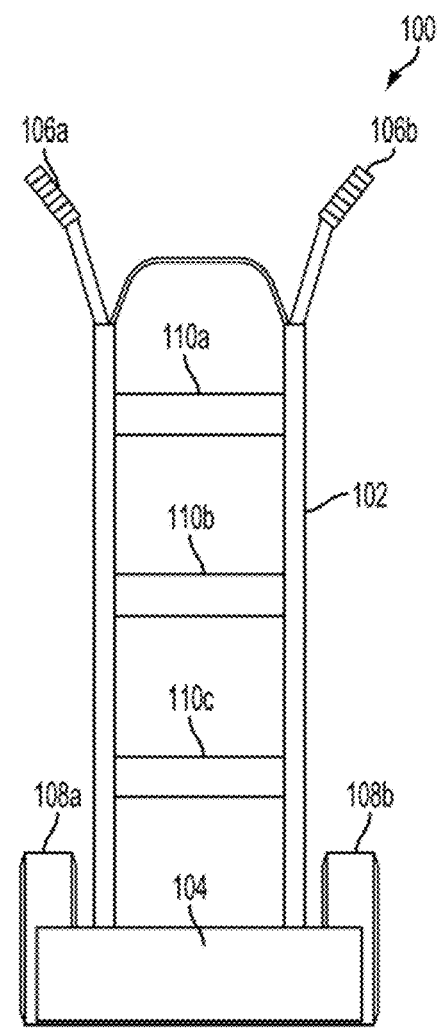
FIG. 1A
(Prior Art)
FIG. 1B
(Prior Art)

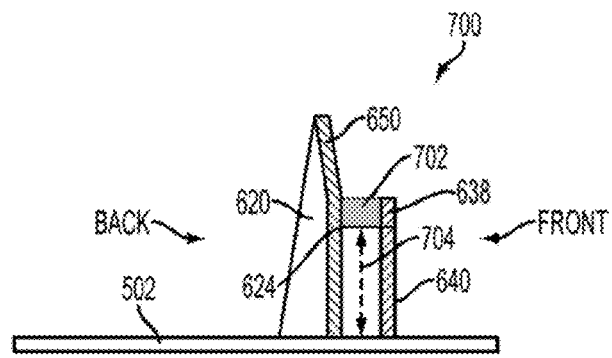
FIG. 7
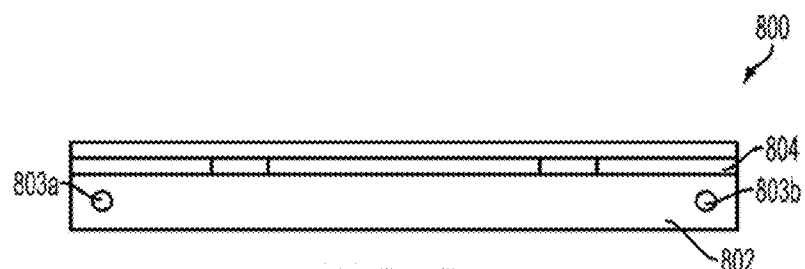
FIG. 8A
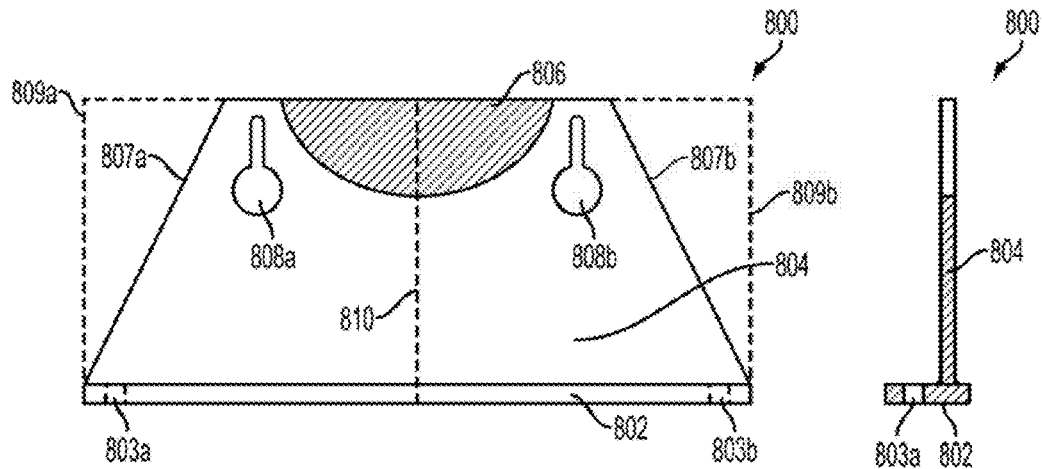
FIG. 8B
FIG. 8C

MODIFICATION FOR A HAND TRUCK

BACKGROUND

Conventional hand trucks provide a simple means for transporting heavy objects over a distance by significantly enhancing a hand-truck operator's ability to lift and move these heavy objects. For example, a person otherwise unable to pick up and move boxes weighing a hundred pounds or more may do so easily with the use of a hand truck.

Currently, hand trucks come in various sizes and configurations, an example of which is illustrated in FIGS. 1A and 1B. FIGS. 1A and 1B illustrate planar views of a right side and a front side, respectively, of a conventional hand truck 100. The hand truck 100 includes a frame body 102 that may optionally include support bars 110a-110c, which reinforce and support the frame body 102. The support bars 110a-110c are also useful in supporting objects being transported with the hand truck 100 as those objects are typically leaned against the support bars 110a-110c during transport. For example, a container may rest against the support bars 110a-110c while the hand truck 100 is pivoted around the axis of wheels 108a, 108b that are coupled together via an axel 112 and that function as a fulcrum. The hand truck 100 also includes a pair of handles 106a, 106b for controlling and maneuvering the hand truck 100. In particular, the handles 106a, 106b enable the hand-truck operator to apply a downward force relative to one side of the wheels 108a, 108b (i.e., the fulcrum) that lifts an object placed on a ledge 104 of the hand truck (i.e., the load). The wheels 108a, 108b also enable the user to easily move the hand truck 100, along with the object resting on the ledge 104, via a pushing or pulling force.

Currently, due to the conventional rectangular, flat shape of hand truck ledges, conventional hand trucks are particularly suited for moving rectangular objects, such as boxes, containers, crates, etc. However, attempts to use conventional hand trucks to move heavy objects of non-rectangular shapes frequently result in difficulty moving such objects effectively or safely. For example, a heavy, irregular object may slide on the hand truck's ledge during transport, potentially falling off the ledge and injuring the hand-truck operator or damaging the object. Despite the ubiquity of hand trucks, moving non-rectangular objects continues to be a design, operational, and safety challenge.

SUMMARY

Various embodiments provide for a bracket coupled to the ledge of a hand truck and configured to engage/secure a tripod having a first foot, a second foot, and a third foot. In such embodiments, the bracket may include a base plate, a front plate coupled to the base plate, a back plate coupled to the base plate, and a gap formed between the front plate and the back plate and configured to receive the first foot and the second foot of the tripod.

In some embodiments, a vertical profile of the back plate is higher than a vertical profile of the front plate.

In some embodiments, the back plate may include a first back plate and a second back plate, a first portion of the gap may be formed between the front plate and the first back plate and may be configured to receive the first foot of the tripod, and a second portion of the gap may be formed between the front plate and the second back plate and may be configured to receive the second foot of the tripod.

In some embodiments, the back plate may include a first back plate and a second back plate, the front plate may include a first front plate and a second front plate, a first portion of the gap may be formed between the first front plate and the first back plate and may be configured to receive the first foot of the tripod, and a second portion of the gap may be formed between the second front plate and the second back plate and may be configured to receive the second foot of the tripod.

In some embodiments, the front plate and the back plate may be configured to limit movement of the first foot and the second foot while the first foot and the second foot are positioned within the gap between the front plate and the back plate.

In some embodiments, each of the front plate and the back plate may be positioned on the bracket to form an obtuse angle.

In some embodiments, a portion of the back plate may be configured to form an obtuse angle.

In some embodiments, the front plate may be positioned perpendicular to the base plate, and at least a portion of the back plate may be positioned perpendicular to the base plate.

In some embodiments, the bracket may be configured to receive the first foot and the second foot such that a portion of the first foot may be received in the gap between the front plate and the back plate and a portion of the second foot may be received in the gap between the front plate and the back plate.

In some embodiments, the front plate and the back plate may be configured to limit movement of the first foot and the second foot while the portion of the first foot and the portion of the second foot are positioned within the gap between the front plate and the back plate.

In some embodiments, the bracket may include a first end plate coupled to the front plate and the back plate at a first end and a second end plate coupled to the front plate and the back plate at a second end.

In some embodiments, the first end plate may include a first lipped portion configured to engage a portion of the first foot, and the second end plate may include a second lipped portion configured to engage a portion of the second foot.

In some embodiments, a first portion of the gap between the front plate and the back plate may be configured to receive the first foot such that a first portion of the first foot contacts a top of the first end plate; and a second portion of the gap between the front plate and the back plate may be configured to receive the second foot such that a first portion of the second foot contacts a top of the second end plate.

In some embodiments, the bracket may include a first interior plate coupled to the front plate and the back plate and a second interior plate coupled to the front plate and the back plate.

In some embodiments, the first portion of the gap between the front plate and the back plate may be configured to receive the first foot such that a second portion of the first foot contacts a top of the first interior plate, and the second portion of the gap between the front plate and the back plate may be configured to receive the second foot such that a second portion of the second foot contacts a top of the second interior plate.

Various embodiments provide for a hand truck for securing a tripod having a first foot, a second foot, and a third foot. In such embodiments, the hand truck may include a top bracket coupled to a body of the hand truck and configured to receive a post of the tripod, a bottom bracket coupled to a ledge of the hand truck and configured to receive the first foot of the tripod and the second foot of the tripod. In some embodiments, the bottom bracket may include a base plate, a front plate coupled to the base plate, a back plate coupled to the base plate, and a gap formed between the front plate and the back plate and configured to receive the first foot and the second foot.

In some embodiments, the front plate and the back plate may be configured to limit movement of the first foot and the second foot while the first foot and the second foot are positioned within the gap between the front plate and the back plate.

In some embodiments, the top bracket may be positioned on the body of the hand truck such that the top bracket may be able to receive the post of the tripod in a manner such that the post of the tripod may be substantially parallel to the body of the hand truck while coupled to the top bracket.

In some embodiments, the top bracket may include a restraint configured to secure the post of the tripod to the body of the hand truck while the first foot and the second foot are positioned within the gap between the front plate and the back plate.

BRIEF DESCRIPTION OF THE DRAWINGS

The accompanying drawings, which are incorporated herein and constitute part of this specification, illustrate example embodiments of the invention, and, together with the general description given above and the detailed description given below, serve to explain features of the invention.

FIGS. 1A and 1B are planar views of a conventional hand truck.

FIG. 7 is a cross-sectional view of an embodiment bottom bracket for use with a conventional hand truck.

FIG. 8A-8C are planar views of an embodiment top bracket for use with a conventional hand truck.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As described, conventional hand trucks are particularly useful for transporting heavy objects that may be impossible or unsafe for a person to lift manually. However, conventional hand trucks are ill-suited for transporting irregular or non-rectangular objects, such as the non-rectangular conventional tripod load illustrated in FIG. 2.

Figure 2:
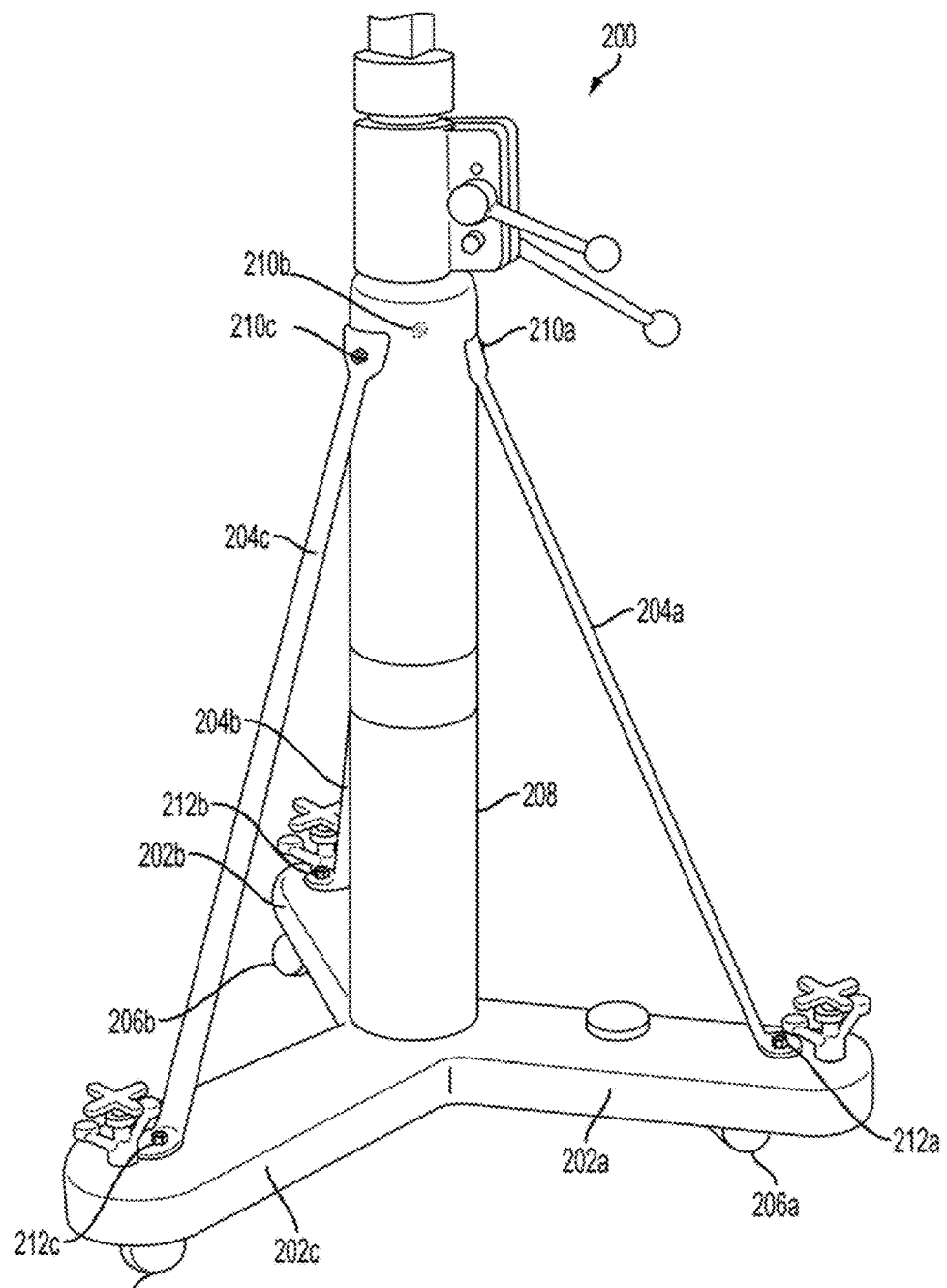
FIG. 2 is a planar view of a conventional tripod load.

FIG. 2 is an isometric, external view of a heavy-duty tripod 200 used to support a mobile laser tracker system (e.g., a laser-tracker tripod manufactured and sold by Faro Technologies, Inc.). The tripod 200 may be constructed from steel or other heavy metals. As a result, the tripod 200 may weigh several hundred pounds (e.g., 300 pounds) and thus may be unwieldy and difficult to move manually.

The tripod 200 may include a central post 208 that is typically cylindrical in shape, though various shapes are possible (e.g., elliptical, hexagonal, rectangular, etc.). The central post 208 may be coupled to a base of three feet 202a-202c arranged to form 120-degree angles between each of the feet 202a-202c, though other angles adding up to 360 degrees are possible (e.g., a 90-degree angle and two 135-degree angles). Reinforcing bars 204a-204c may be coupled to points 212a-212c on the feet 202a-202c and may be coupled to the central post 208 at points 210a-210c. The reinforcing bars 204a-204c reinforce the central post 208 and contribute to maintaining the central post 208 in a fixed position relative to the feet 202a-202c.

Figure 9A:
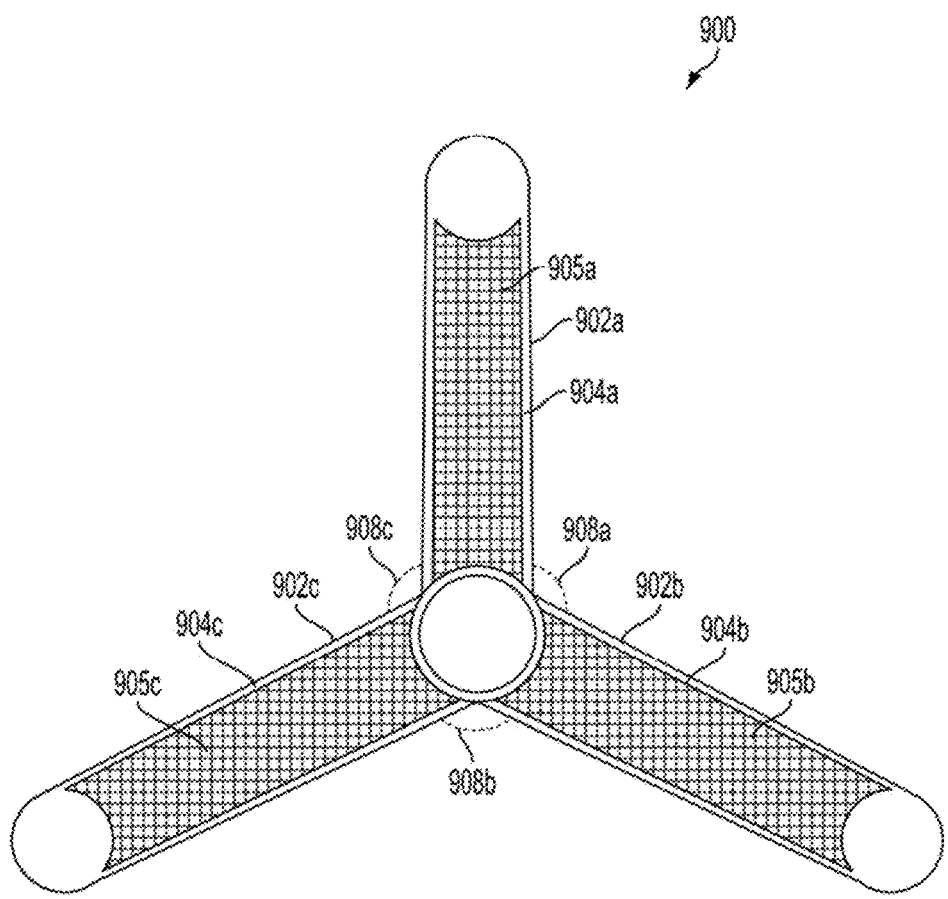
FIG. 9A is an overhead cutaway view of feet of a conventional tripod load.
Figure 9B:
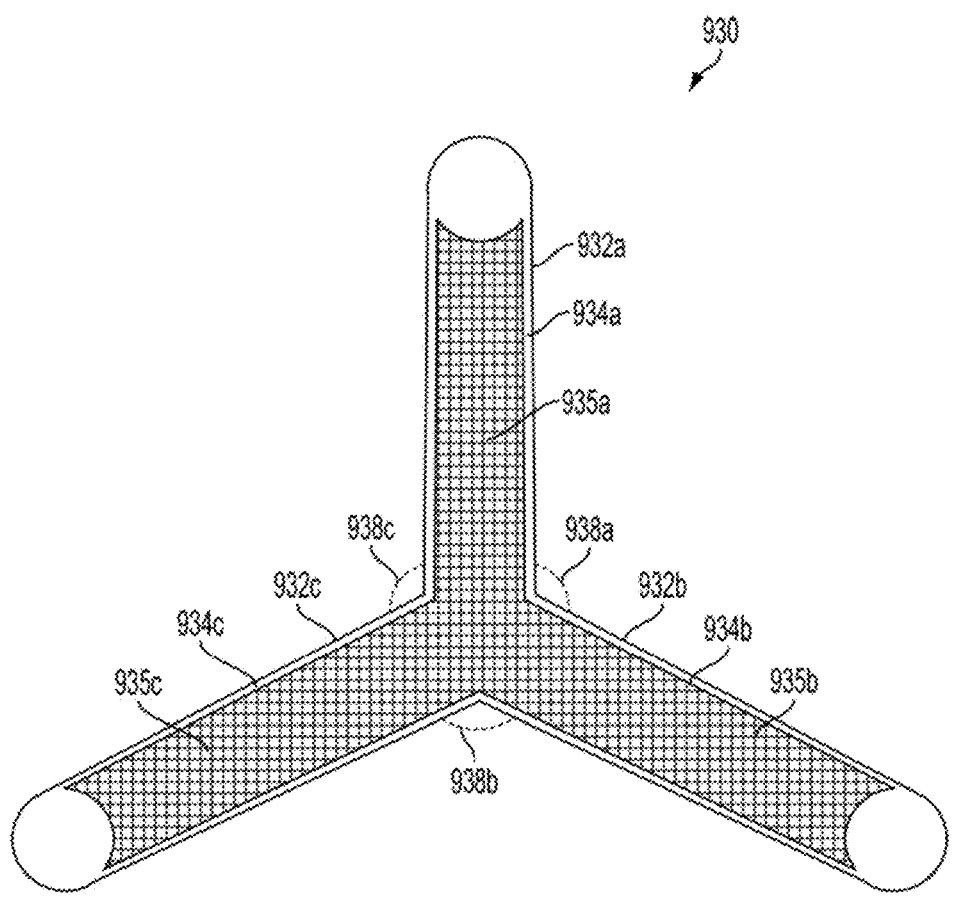
FIG. 9B is an overhead cutaway view of feet of a conventional tripod load.

Typically, wheels 206a-206c may be coupled to the bottom of the each of the feet 202a-202c, such as in a hollowed-out portion underneath each of the feet 202a-202c (see, e.g., FIGS. 9A, 9B). The wheels 206a-206c enable an operator of the tripod 200 to move the tripod 200 via a pushing or pulling force. The wheels 206a-206c may be typically small relative to the overall size of the tripod 200 and thus provide limited mobility of the tripod 200. Specifically, the wheels 206a-206c under the feet 202a-202c typically have a low ground clearance and thus are most suited for moving the tripod 200 over flat surfaces, such as finished flooring or leveled concrete.

In some circumstances, the low ground clearance of the wheels 206a-206c causes transportation of the tripod 200 to be difficult, dangerous, or impractical. For example, an operator of the tripod 200 may be unable to push the tripod 200 over uneven surfaces (e.g., steps, sills, etc.) or other obstacles. As such, the operator of the tripod 200 may need to lift and carry the tripod 200 or otherwise negotiate the tripod 200 over an obstacle, thereby risking injury to the operator and potential damage to the tripod. For example, while pulling the tripod 200 up a step, the tripod operator may lose control of and drop the tripod 200.

Due to the difficulty of moving the tripod 200 over uneven surfaces or over obstacles/obstructions, the utility of the tripod 200 may be reduced for the tripod operator. While a conventional hand truck (e.g., the hand truck 100 of FIGS. 1A, 1B) is typically useful for moving heavy objects like the tripod 200, the non-rectangular shape of the base of the tripod 200 (i.e., the angled feet 202a-202c) is not suited for use with the conventional hand truck 100 because of the risk that the tripod 200 will not fit properly on the ledge 104 of the conventional hand truck 100 and the further risk that the tripod 200 may slip off of the ledge 104 during transportation, potentially injuring the hand-truck operator and damaging the tripod 200 and/or the hand truck 100.

In overview, to address these and other limitations of conventional hand trucks, various embodiments provide for a bracket (referred to herein as a "bottom bracket") coupled to the ledge of a hand truck (e.g., the hand truck 100 of FIG. 1) and configured to engage/secure a heavy-duty tripod (e.g., the tripod of FIG. 2). Specifically, in various embodiments, the bottom bracket may include a front plate (e.g., front plates 504, 640, 1004, 1034a, 1034b, 1064a, 1064b of FIGS. 5A, 6C, 6D, and 10A-10C), a back plate (e.g., back plates 506, 650, 1006, 1036a, 1036b, 1066a, 1066b of FIGS. 5A, 6E, 6F, 7, and 10A-10C), and a gap formed between the front plate and the back plate (e.g., gaps 511, 1008a, 1008b, 1038a, 1038b, 1068a, 1068b of FIGS. 5A and 10A-10C). In such embodiments, a first portion of the gap may be configured to receive a first foot of the tripod (e.g., foot 202a of FIG. 2), and a second portion of the gap may be configured to receive a second foot of the tripod (e.g., the second foot 202b of FIG. 2). Once the two feet of the tripod are placed in the first and second portions of the gap, the tripod may be held firmly in place between the front plate and the back plate, thereby enabling an operator of the hand truck to easily and safely move the tripod with the hand truck.

In some embodiments, the hand truck may include a second bracket (sometimes referred to herein as a "top bracket"). In such embodiments, the top bracket may be configured to receive the central post of the tripod, thereby further securing the tripod to the hand truck and decreasing the likelihood that the tripod will slip out of the bottom bracket during transportation.

Figure 3A:
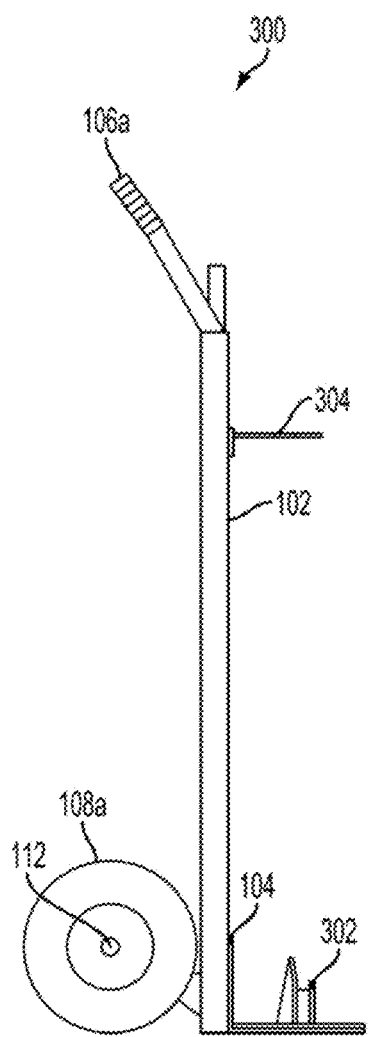
FIGS. 3A-3C are planar views of an embodiment hand truck.
Figure 3B:
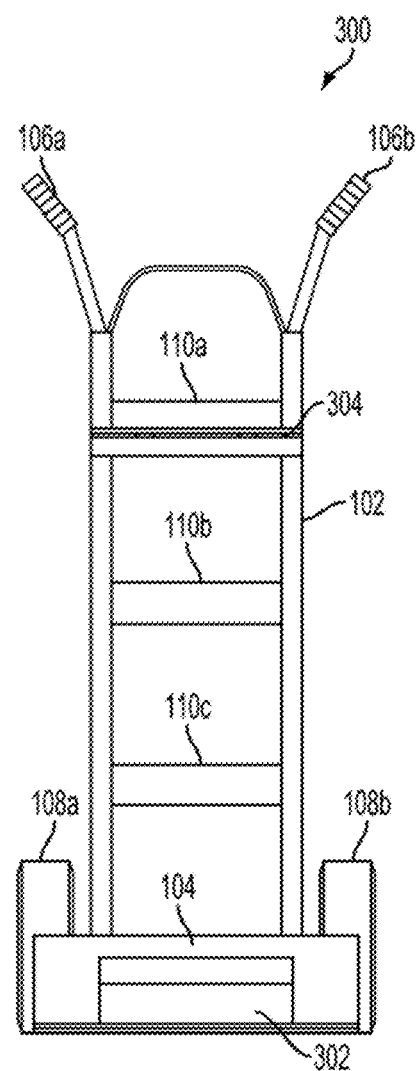

FIGS. 3A and 3B illustrate planar views of a bottom bracket 302 coupled to a hand truck 300, according to various embodiments. Specifically, FIG. 3A illustrates a planar view of a right side of the hand truck 300, and FIG. 3B illustrates a planar view of the front side of the hand truck 300.

With reference to FIGS. 3A and 3B, in some embodiments, the hand truck 300 may include various structural components commonly found on conventional hand trucks (e.g., the hand truck 100 of FIGS. 1A, 1B), including the frame body 102, the ledge 104, the handles 106a, 106b, the wheels 108a, 108b, the support bars 110a-110c, and the axel 112 (see FIGS. 1A, 1B).

Figure 10A:
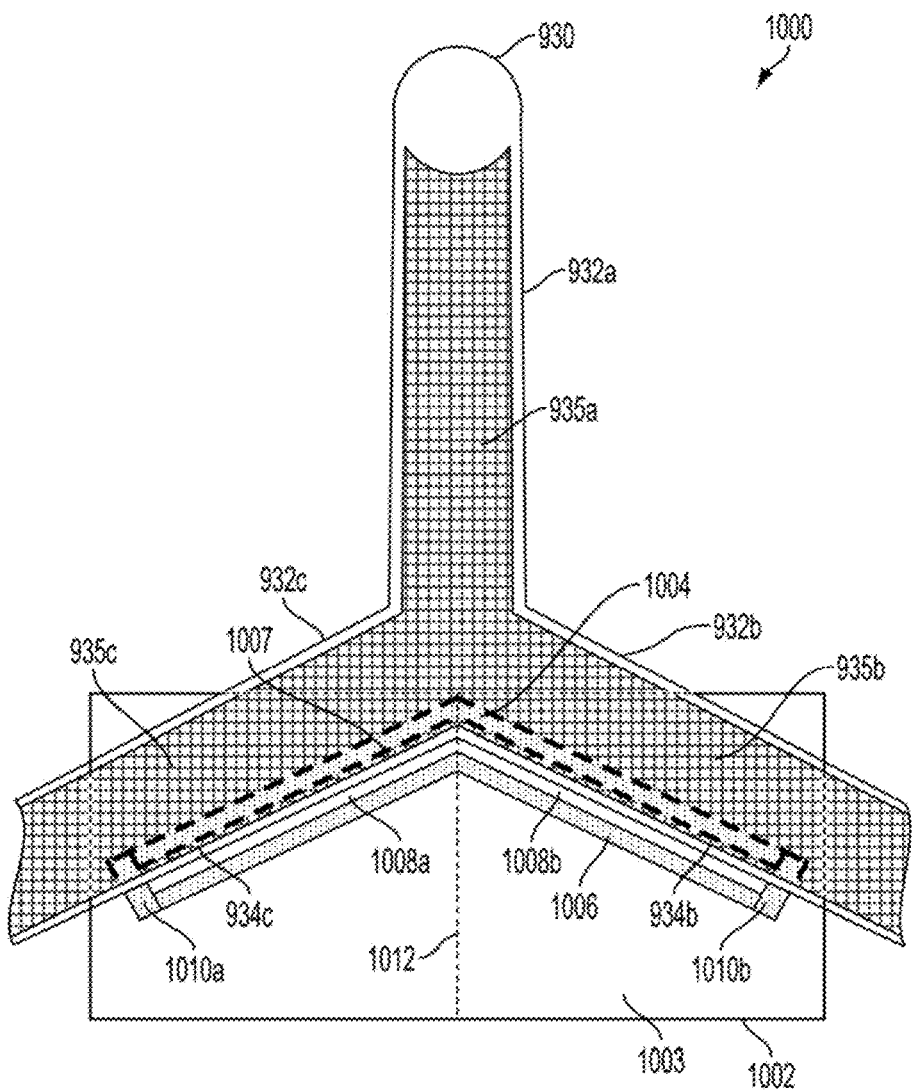
FIG. 10A is overhead cutaway view of an embodiment bottom bracket engaging a portion of a first foot of a conventional tripod load and a portion of a second foot of the conventional tripod load, according to various embodiments.
Figure 10B:
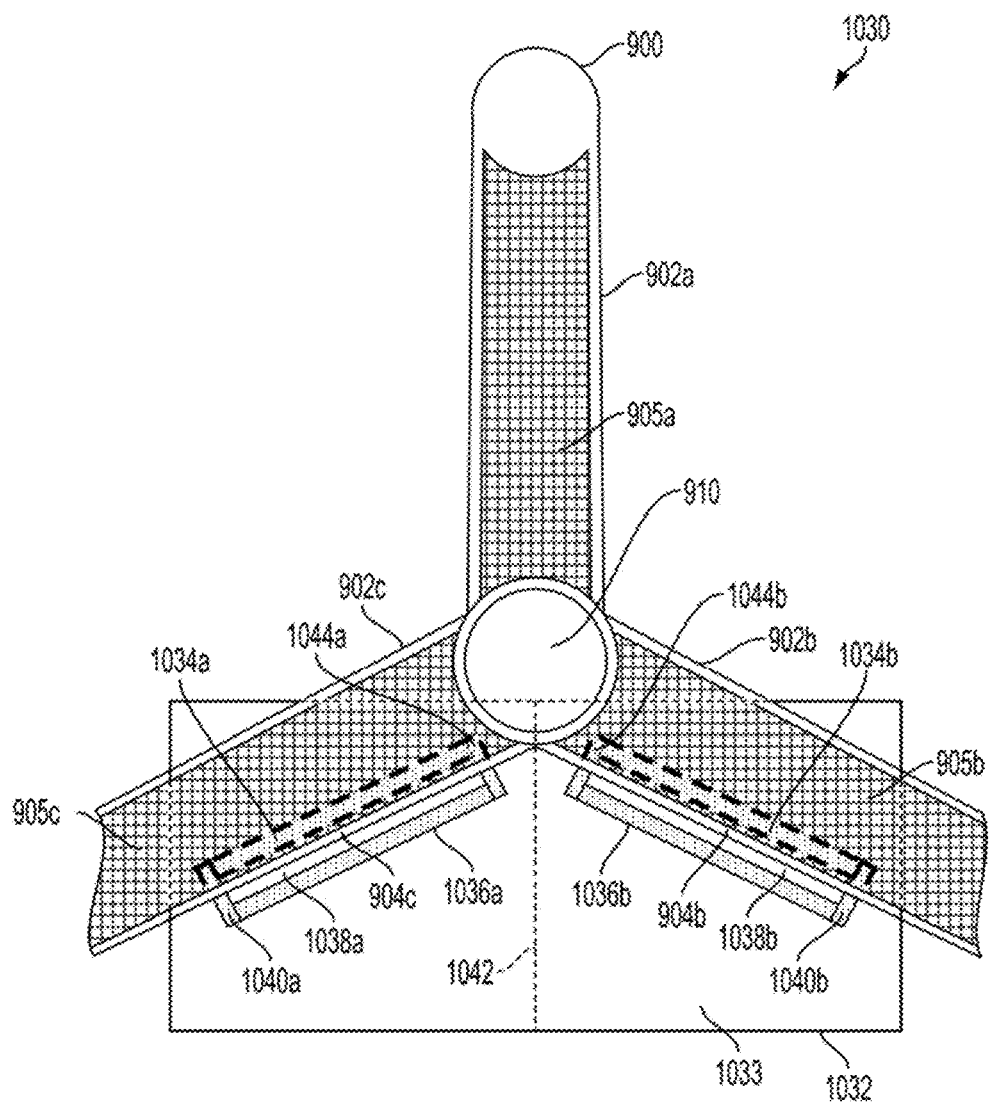
FIG. 10B is another cutaway view of an embodiment bottom bracket engaging a portion of a first foot and a portion of a second foot of a conventional tripod load, according to various embodiments.
Figure 10C:
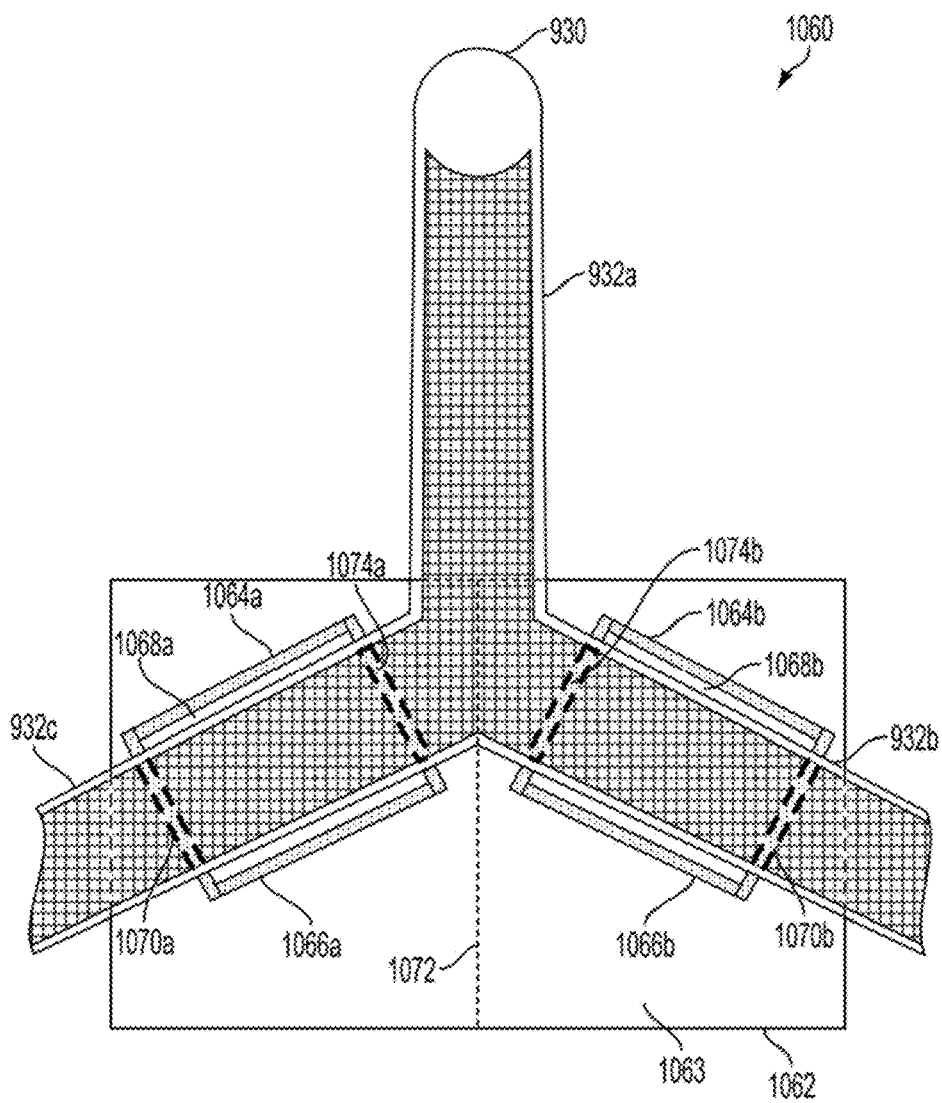
FIG. 10C is a cutaway view of an embodiment bottom bracket engaging a first foot and a second foot of a conventional tripod load, according to various embodiments.

In various embodiments, the bottom bracket 302 may be configured to receive a first foot 202a and a second foot 202b of the tripod 200 in order to engage the tripod 200 (see, e.g., FIGS. 10A-10C). In some embodiments, the hand truck 300 may include a top bracket 304 configured to receive the central post 208 of the tripod 200. In such embodiments, the top bracket 304 may include a cutout section 329 (see, e.g., cutout section 806 of FIGS. 8A-8C) that conforms to the shape of the central post 208. In other words, the top bracket 304 may be configured to receive the shape of the central post 208 so that the central post 208 is flush with the cutout section 329 of the top bracket 304. The top bracket 304 may support and/or be in contact with the central post 208 of the tripod, such as when the hand truck 300 is pivoted about the axis of the wheels 108a, 108b and when the bottom bracket 302 has engaged the feet 202a, 202b of the tripod 200, for example, as illustrated in FIG. 3C.

Figure 3C:
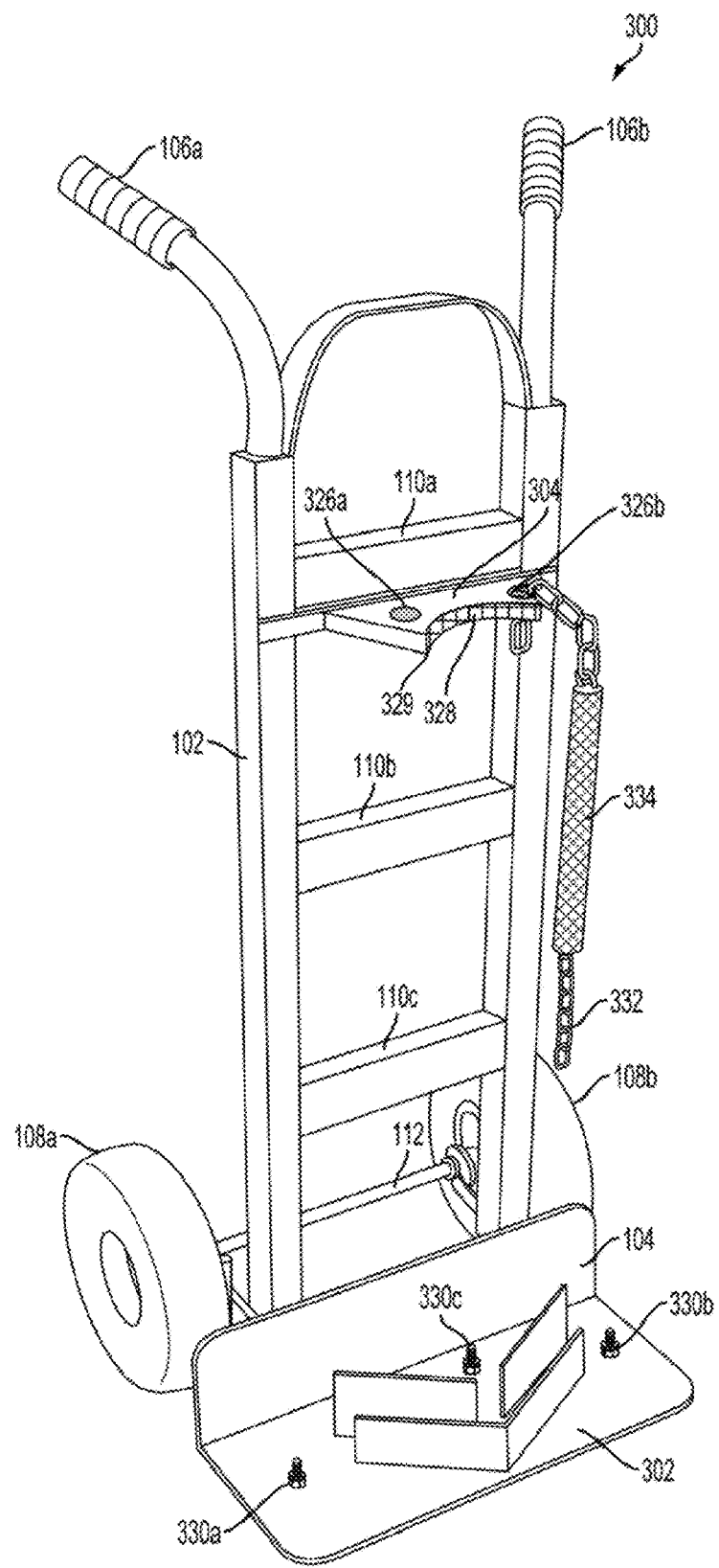

FIG. 3C illustrates an isometric, external view of the front side of the hand truck 300, according to some embodiments. In some embodiments, the top bracket 304 of the hand truck 300 may be coupled to a restraint 332. In some embodiments, the restraint 332 may be a chain, strap, cord, elastic band (e.g., a bungee cord), string, rope, and/or various other materials that may be coupled to the top bracket 304 and configured to hold the central post 208 of a tripod securely within the top bracket 304. Once the central post 208 is received in the top bracket 304, the restraint 332 may be wrapped around the central post 208 and secured to the top bracket 304 at two or more coupling points 326a, 326b, which may be, for example, key-hole slots configured to engage the restraint 332 in order to secure the restraint 332 within the top bracket 304.

In some embodiments, the top bracket 304 may include trim 328 around the cutout section 329 of the top bracket 304 that receives the central post 208 and may be configured to provide a cushion between the top bracket 304 and the central post 208. Similarly, in some embodiments, the restraint 332 may be coupled to a cushion 334 to prevent damage to the central post 208 once the restraint 332 is fastened around the central post 208. For example, the trim 328 and/or cushion 334 may be formed from foam, rubber, plastic, or similar materials that may provide cushioning and prevent damage to the top bracket 304 and/or the central post 208 of the tripod.

In some embodiments, the bottom bracket 302 may be coupled to a ledge of the hand truck (e.g., the ledge 104) via attachment points 330a-330c. In some embodiments, the attachment points 330a-330c may be configured to receive bolts, screws, fasteners, adhesive, and/or various other means of attaching the bottom bracket 302 to the ledge 104. In some embodiments, the bottom bracket 302 may be coupled to the ledge 104 by welding the bottom bracket to the ledge 104. In some embodiments, the bottom bracket 302 may be formed as part of the ledge 104 and thus may be an integral part of the ledge 104 rather than a separate piece attached to the ledge 104.

Figure 4B:
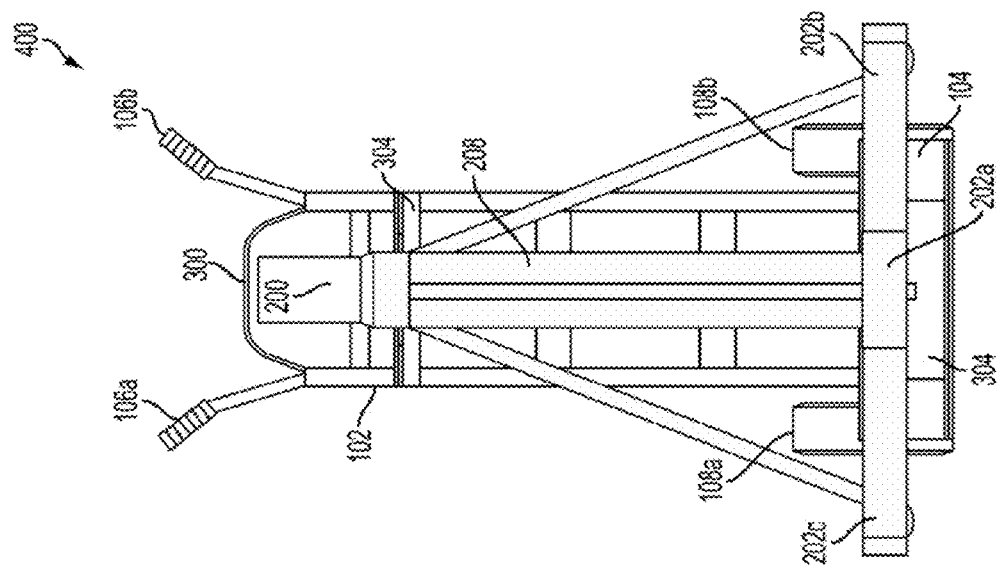
FIG. 4A-4C are planar views of an embodiment hand truck engaging a conventional tripod load, according to various embodiments.
Figure 4A:
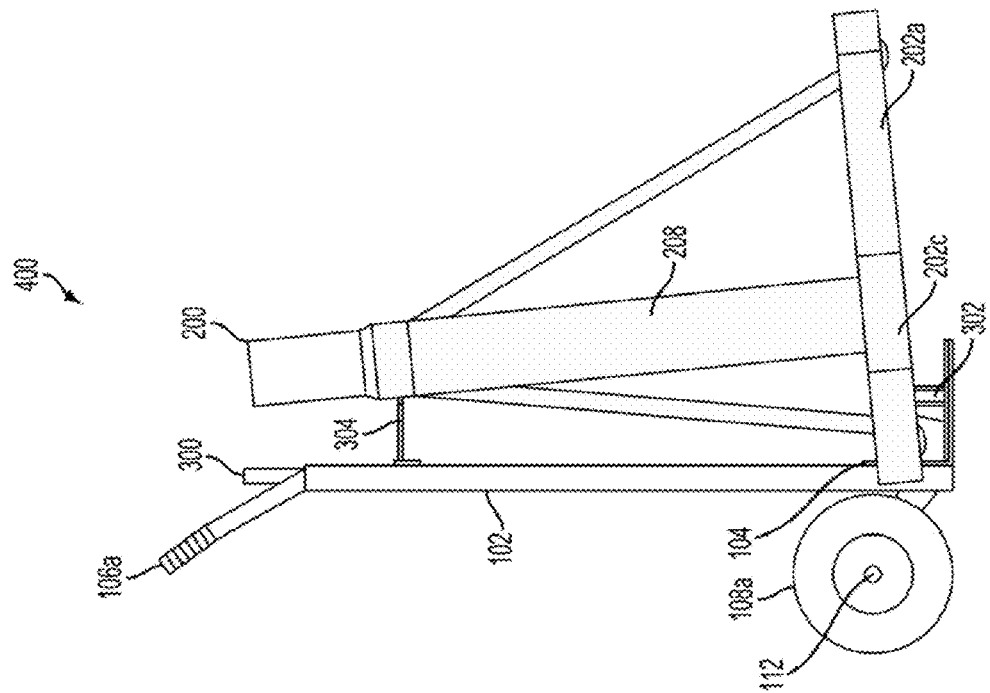

FIGS. 4A and 4B illustrate planar views of a right side and a front side, respectively, of a system 400 that includes the hand truck 300 coupled to the tripod 200, according to some embodiments. With reference to FIGS. 4A and 4B, as illustrated in the system 400, the hand truck 300 may engage the tripod 200 via the bottom bracket 302 and the top bracket 304. In some embodiments, the bottom bracket 302 may receive the second foot 202b and the third foot 202c of the tripod 200, such as by receiving a portion of the feet 202b-202c in one or more gaps formed between one or more front plates and one or more back plates on the bottom bracket 302 (see, e.g., FIGS. 10A-10C). In some embodiments, the bottom bracket 302 may receive the feet 202b-202c such that the tripod 200 is held off of the ground and/or the ledge 104 by a certain height (see, e.g., the clearance 704 described with reference to FIG. 7).

In some embodiments, the top bracket 304 may engage the central post 208 of the tripod, such as by receiving the central post 208 in a cutoff section of a protruding portion of the top bracket 304 (e.g., the cutout section 806 of FIG. 8).

Figure 4C:
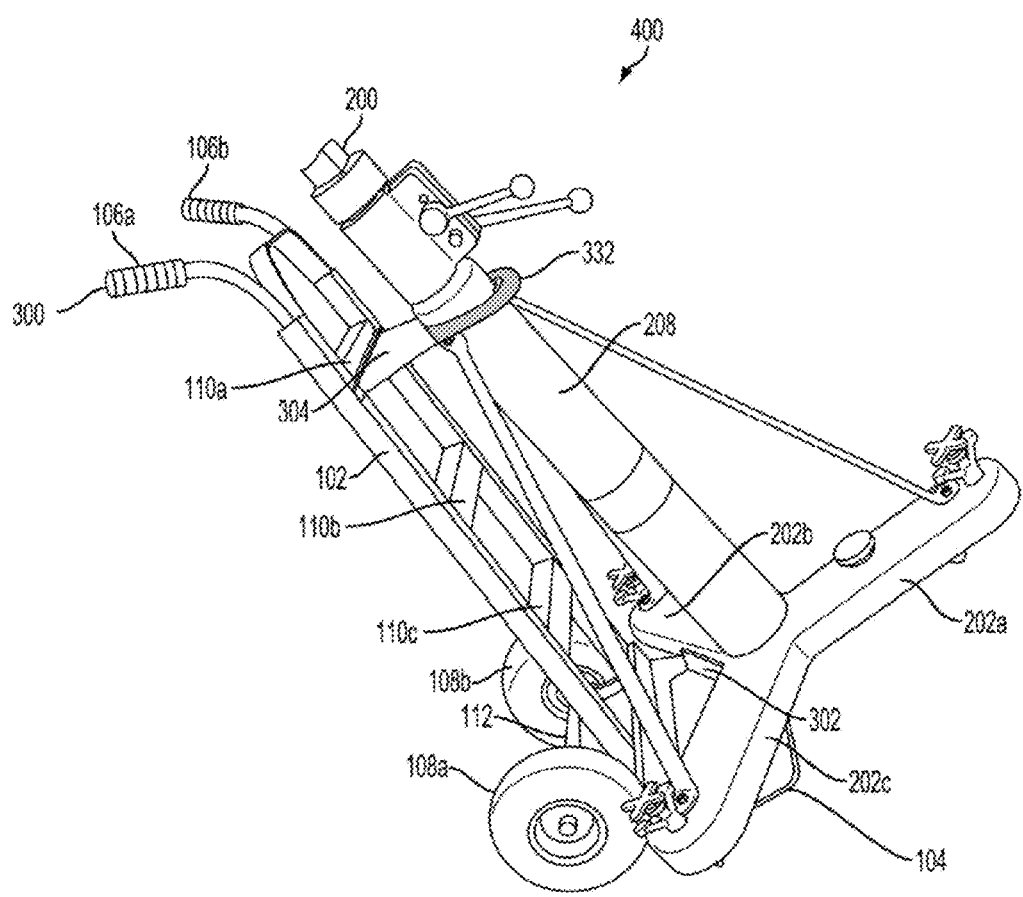

FIG. 4C illustrates an isometric, external view of the system 400 that includes the hand truck 300 coupled to the tripod 200, according to some embodiments. With reference to FIGS. 4A-4C, in some embodiments, the bottom bracket 302 may receive one or more portions of the feet 202b, 202c of the tripod 200 in a gap formed between a back plate and a front plate of the bottom bracket 302 (partially shown). By engaging the one or more portions of the feet 202b-202c, the bottom bracket 302 may fix the position of the feet 202b-202c relative to the bottom bracket 302 and the hand truck 300. As such, the hand truck 300 may be pivoted about an axis of the wheels 108a, 108b (as illustrated) along with the tripod 200, thereby enabling an operator of the hand truck 300 to easily move the tripod 200 because the tripod 200 is "locked" into position in the bottom bracket 302.

In some embodiments, the top bracket 304 may receive the central post 208 of the tripod 200, and the restraint 332 (see FIG. 3C) may be coupled to the top bracket 304 and placed around the central post 208 in order to keep the central post 208 of the tripod 200 in a fixed position relative to the hand truck 300.

In some embodiments, the top bracket 304 may be positioned at a height on the hand truck 300 such that the central post 208 may be secured and held in a position substantially parallel to the frame body 102 of the hand truck 300 while the central post 208 is in contact with the top bracket 304.

While the bottom bracket 302 is described as receiving the feet 202b, 202c of the tripod 200, the bottom bracket 302 may be configured to receive any two feet of the tripod 200 (e.g., the feet 202b, 202c or the feet 202a, 202c).

Figure 5A:
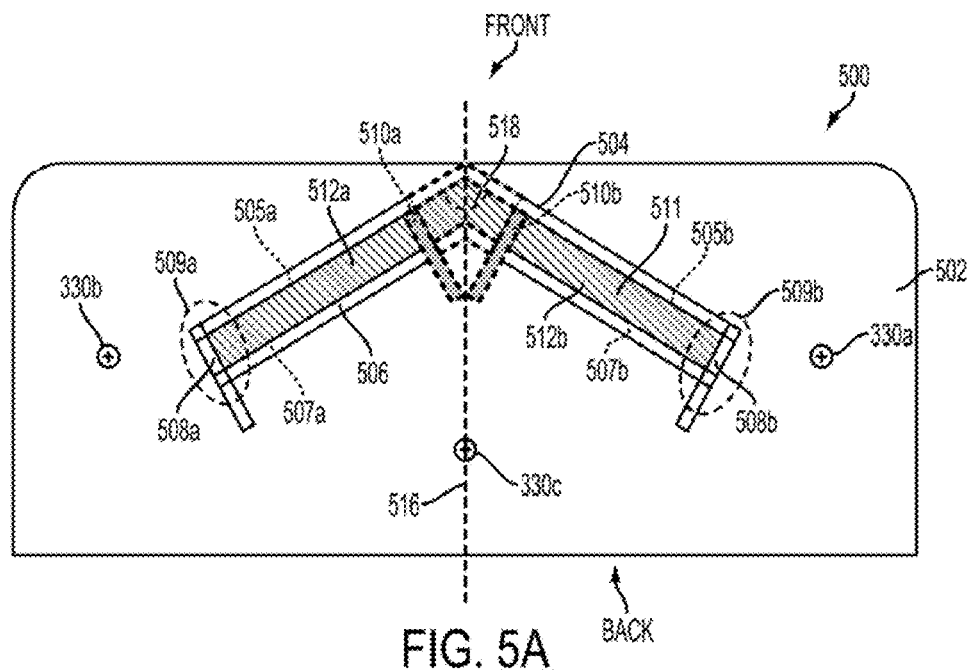
FIG. 5A is an overhead view of an embodiment bottom bracket for use with a conventional hand truck.

FIG. 5A illustrates an overhead view of a top side of a bottom bracket 500 according to various embodiments. In such embodiments, the bottom bracket 500 may be similar to the bottom bracket 302 described with reference to FIGS. 3A-4C. With reference to FIGS. 1A-5A, the bottom bracket 500 may include a base plate 502, a front plate 504, a back plate 506, and end plates 508a, 508b.

In some embodiments, the base plate 502 may be coupled to the ledge 104 of the hand truck 300, such as at the attachment points 330a-330c. The attachment points 330a-330c may be located in various locations on the base plate 502. In some preferred embodiments, the base plate 502 may include three attachment points (as illustrated). However, in some embodiments, the base plate 502 may include zero or more attachment points. For example, the base plate 502 may include zero attachment points in situations in which the bottom bracket 500 is formed as an integral part of the hand truck (i.e., the bottom bracket 500 is cast as part of the ledge such that there is no structural separation between the ledge of the hand truck and the bottom bracket 500 or in embodiments where the bottom bracket 500 is welded into place). In another example (not shown), the base plate 502 may include four attachment points at each corner of the base plate 502, and these four attachment points may be configured to receive a bolt that may be used to couple the bottom bracket 500 to the ledge of the hand truck.

In some embodiments, the front plate 504 and the back plate 506 may be positioned on the base plate 502 such that the front plate 504 is closer to the front of the base plate 502 (indicated in FIG. 5A as "FRONT") than the back plate 506, which may be positioned closer to the back of the base plate 502 (indicated in FIG. 5A as "BACK"). In such embodiments, the "front" of the base plate 502 may be farther away from the body of the hand truck (and closer to the tripod) than the "back" of the base plate 502.

The front plate 504 and the back plate 506 may each be configured to form an obtuse angle 518 (e.g., 120 degrees) with respect to a center line 516 that runs approximately down the center of the base plate 502. In some embodiments, the front plate 504 and/or the back plate 506 may be configured to form the obtuse angle 518 by bending the front plate 504 and/or the back plate 506 into the obtuse angle 518 before coupling the front plate 504 and/or the back plate 506 to the base plate 502. In some embodiments, two (or more) plates may be joined together at the obtuse angle 518 with respect to the center line 516 in order to form each of the front plate 504 and/or the back plate 506.

In some embodiments, the obtuse angle 518 may be based on an angle between two feet of a tripod (e.g., the feet 202b-202c of the tripod 200). For example, in situations in which each foot of the tripod forms a 120-degree angle with each other foot, the obtuse angle 518 may be (or may approximately be) 120 degrees in order to accommodate the shape of the tripod's feet (see, e.g., FIGS. 10A-10C). In such embodiments, the angles of the front plate 504 and the back plate 506 may correspond with the angle of the feet of the tripod in order to keep the tripod aligned, centered, and/or balanced on the bottom bracket 500 and thus may also be formed as a right angle or an acute angle.

In various embodiments, a gap 511 may be formed between the front plate 504 and the back plate 508. In particular, a first portion 512a of the gap 511 may be formed between the front plate 504 and the back plate 506 to one side of the center line 516, and a second portion 512b of the gap 511 may be formed between the front plate 504 and the back plate 506 to the other side of the center line 516. The first portion 512a of the gap 511 may be configured to receive a first foot of the tripod, and the second portion 512b of the gap 511 may be configured to receive a second foot of a tripod such that the first foot and second foot of the tripod are securely positioned within the gap 511. In some embodiments, the portions 512a, 512b of the gap 511 may each receive, respectively, a portion of the first foot and the second foot of the tripod (see FIGS. 10A-10C).

In some embodiments, the front plate 504 may optionally include a first front plate 505a and a second front plate 505b. As illustrated in the bottom bracket 500, the dotted portion of the front plate 504 may be omitted to form two separate front plates (e.g., a first front plate 505a and a second front plate 505b). In such embodiments, the first front plate 505a and the second front plate 505b may be two separate plates that, if extended towards the center line 516, would form the obtuse angle 518.

Further, in some optional embodiments, the back plate 506 may similarly include two separate plates (e.g., the first end plate 507a and the second end plate 507b) that are also separated from each other and that would form the obtuse angle 518 if extended towards the center line 516.

The end plates 508a, 508b may be coupled to each of the front plate 504 and the back plate 506 at a first end and a second end, respectively (illustrated as dotted lines 509a and 509b). The end plates 508a, 508b may strengthen and reinforce the front plate 504 and the back plate 506 to prevent the plates 504-506 from deforming due to the weight of the tripod once the first foot and the second foot of the tripod are received in the first and second portions 512a, 512b of the gap 511. For example, the end plates 508a, 508b may extend past the back plate 506 towards the back of the bottom bracket 500 to reinforce the back plate 506 (see, e.g., FIG. 6B), during which time the hand truck and tripod may be pivoted backwards such that the tripod's feet are in contact with and exerting a force on the back plate 506 (see, e.g., FIG. 4C).

In some optional embodiments, the bottom bracket 500 may include one or more interior plates on each side of the center line 516 (e.g., a first interior plate 510a and a second interior plate 510b). In such optional embodiments, each of the interior plates 510a, 510b may be coupled to the front plate 504 and the back plate 506 and may be configured to provide support/reinforce the front plate 504 and/or the back plate 506 as generally described with reference to the end plates 508a, 508b.

In some embodiments, the base plate 502 may reinforce the ability of the ledge of the hand truck to handle the weight of the tripod. In some embodiments, the ledge of the hand truck may serve as the base plate 502. In other words, the front plate 504, back plate 506, the end plates 508a, 508b, and interior plates 510a, 510b may be coupled directly to the ledge of the hand truck without requiring a separate base plate 502. For example, each of the front plate 504, back plate 506, the end plates 508a, 508b, and interior plates 510a, 510b may be welded directly to the ledge of the hand truck.

In some embodiments, the base plate 502, the front plate 504, the back plate 506, the end plates 508a, 508b, and the interior plates 510a, 510b may be made of various types of material, such as one or more of steel, iron, aluminum, other metals, alloys of two or more metals, high-durability plastic, as well as any combination of these materials or other materials suitable for supporting the weight of a heavy-duty tripod (e.g., weights up to six hundred pounds).

Figure 5B:
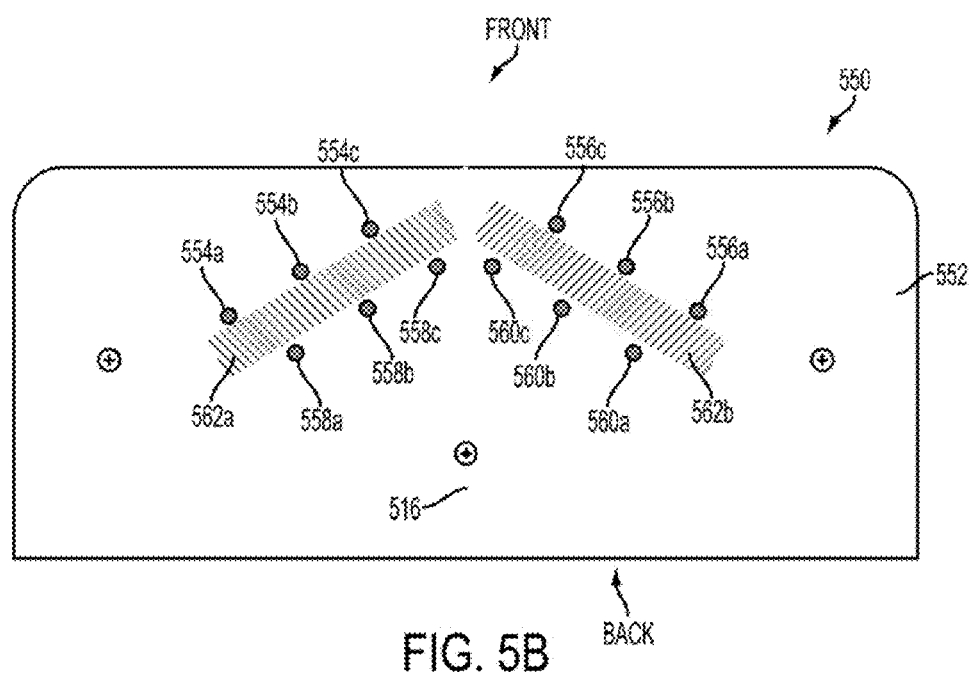
FIG. 5B is an overhead view of another embodiment bottom bracket for use with a conventional hand truck.

FIG. 5B illustrates an overhead view of a top side of another bottom bracket 550, according to some embodiments. In such embodiments, the bottom bracket 550 may be similar to the bottom brackets 302, 500 described with reference to FIGS. 3A-5A. With reference to FIGS. 1A-5B, the bottom bracket 550 may include a base plate 552 that may be coupled to the ledge 104 of the hand truck 300.

In some embodiments, the bottom bracket may include a first set of front pins 554a-554c, a second set of front pins 556a-556c, a first set of back pins 558a-558c, and a second set of back pins 560a-560c. The pins 556a-560c may protrude from the base plate 552 and may be configured similarly to the front plate 504 and the back plate 506. In other words, rather than using solid plates to receive a tripod foot (e.g., the front plate 504 and the back plate 506), the bottom bracket 550 may utilize raised pins (e.g., raised bolts, hooks, etc.) that may be configured to receive tripod feet in a similar manner.

The pins 556a-560c may be configured to form a first gap 562a and a second gap 562b. Specifically, the first gap 562a may be formed between the first set of front pins 554a-554c and the first set of back pins 558a-558c, and the second gap 562b may be formed between the second set of front pins 556a-556c and the second set of back pins 560a-560c. In such embodiments, the first gap 562a and the second gap 562b may receive a portion of a first tripod foot and a portion of a second tripod foot, respectively, in a manner similar to the first gap portion 512a and the second gap portion 512b, as described. In such embodiments, the pins 556a-560c may be spaced on the base plate 552 to allow the lipped portion of a tripod foot to fit within the gaps 562a, 562b.

Figure 6A:
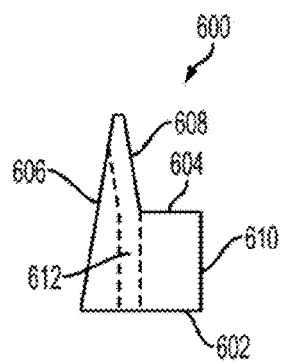
FIG. 6A is a side view of an interior plate of an embodiment bottom bracket.

FIG. 6A illustrates a side view of an interior plate 600 of a bottom bracket according to some embodiments. The interior plate 600 may be similar to the interior plates 510a-510b optionally included on the bottom bracket 500 as described with reference to FIG. 5A.

With reference to FIGS. 1A-6A, the interior plate 600 may include multiple sides. For example, the interior plate 600 may include a bottom side 602 coupled to a base plate (e.g., the base plate 502), such as via welding, adhesive, mechanical attachments (bolts, screws, etc.), and/or various other means. The interior plate 600 may include a back side 606 that may be positioned towards the back of the base plate (e.g., the "back" of the bottom bracket 500 as described with reference to FIG. 5A) and may be configured to slant towards the front side 610, which may be positioned towards the front of the base plate.

The interior plate 600 may be coupled with a front plate (e.g., the front plate 504) at or along the front side 610 of the interior plate 600. The interior plate 600 may also be coupled to a back plate (e.g., the back plate 506) at a portion 612 of the interior plate 600. In such embodiments, the interior plate 600 may provide support and/or may reinforce the front plate and the back plate to which the interior plate 600 is attached/coupled. In some embodiments, the front plate may be coupled to the front side 610 such that the front plate is substantially perpendicular to the front side 610 (see, e.g., the interior plate 510a coupled to the first front plate 505a as illustrated in FIG. 5A).

The interior plate 600 may include a tapered side 608 and a top side 604, each of which may come into contact with a foot of a tripod. For example, the tapered side and the top side 604 may support a portion of the tripod's foot in situations in which the foot has been received by the bottom bracket. For example, a portion of the foot may rest against the tapered side 608 and may rest on top of the top side while the tripod is tipped back into the hand truck (see, e.g., FIG. 4C).

Figure 6B:
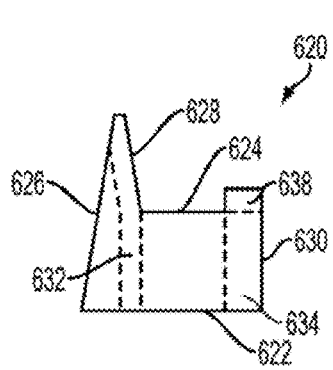
FIG. 6B is a side view of an end plate of an embodiment bottom bracket.

FIG. 6B illustrates a side view of an end plate 620 according to some embodiments. The end plate 620 may be similar to the end plates 508a, 508b coupled to the base plate 502 as described with reference to FIG. 5A.

With reference to FIGS. 1A-6B, the end plate 620 may include a bottom side 622 that may be coupled to a base plate of a bottom bracket (e.g., the base plate 502 of the bottom bracket 500). The end plate 620 may include a back side 626 positioned towards the back of the base plate and a front side 630 positioned towards the front of the base plate. In some embodiments, the back side 626 may be slanted in order to enable the end plate 620 to reinforce/strengthen a back plate coupled substantially perpendicular to a portion 632 of the end plate 620. Specifically, the back side 626 may be angled to transfer force experienced from the weight of the tripod's feet acting towards the back side 626 to the base plate.

In some embodiments, the end plate 620 may be coupled to a front plate such that the front plate is coupled substantially perpendicular to a portion 634 of the end plate 620 (see, e.g., the end plate 508a coupled to the front plate 504 as illustrated in FIG. 5A).

The end plate 620 may include a top side 624 between a tapered side 628 and a lipped portion 638 of the end plate 620. In some embodiments, a foot of a tripod may contact (e.g., rest on or against) the top side 624 and/or the tapered side 628. For example, the tripod's foot may rest on the top side 624 while the tripod is in an upright position and may rest on the top side 624 and/or the tapered side while the tripod is tipped back to be received by the top bracket (see, e.g., FIG. 4C).

In some embodiments, the lipped portion 638 of the end plate 620 may be configured to limit the movement of a tripod foot between the tapered side 628 and the lipped portion 638. For example, the lipped portion 638 may hook the underside of a hollowed-out portion of a tripod's foot to secure the foot to the bottom bracket (see FIG. 7).

Figure 6C:
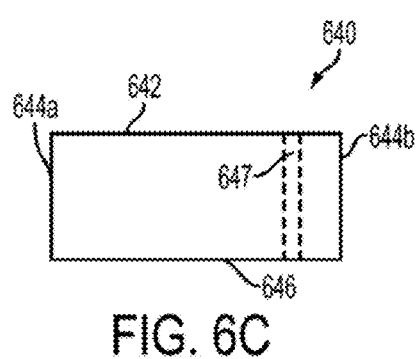
FIGS. 6C-6D are views of a front plate of an embodiment bottom bracket according to various embodiments.
Figure 6D:
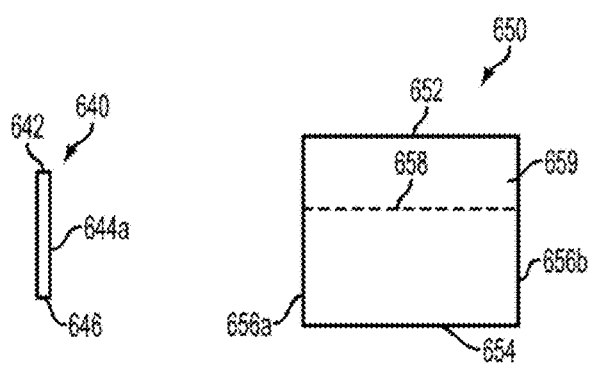

FIGS. 6C and 6D illustrate a front view and a side view, respectively, of a front plate 640 according to some embodiments. In some embodiments, the front plate 640 may be similar to a portion of the front plate 504 (e.g., the first front plate 505a of FIG. 5A) coupled to the base plate 502 as described with reference to FIG. 5A. Specifically, with reference to FIGS. 1A-6D, the front plate 640 may include a bottom side 646 that may be coupled to a base plate (e.g., the base plate 502).

The front plate 640 may include a first side 644a, a second side 644b, and a top side 642. In some embodiments, the first side 644a may be coupled to an end plate (e.g., the end plate 620) such that the end plate is substantially perpendicular to the first side 644a. For example, the first side 644a may be coupled to the portion 634 of the end plate 620 in order to receive the benefit of the structural reinforcement provided by the end plate 620, as described. In some optional embodiments, the front plate 640 may be coupled to an interior plate (e.g., the front side 610 of the interior plate 600) along a portion 647 of the front plate 640.

Figure 6E:
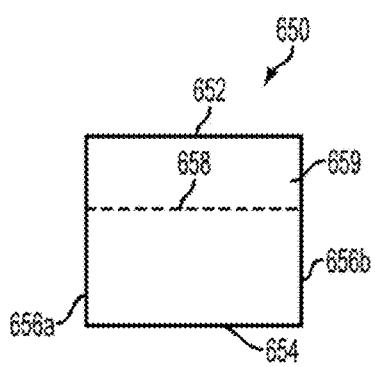
FIGS. 6E-6F are views of an embodiment back plate of a bottom bracket.
Figure 6F:
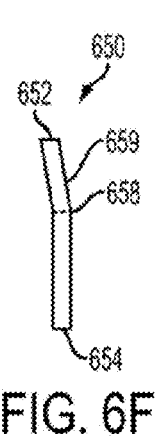

FIGS. 6E and 6F illustrate a front view and a side view, respectively, of a back plate 650 according to some embodiments. The back plate 650 may be similar to the first end plate 507a coupled to the base plate 502 as described with reference to FIG. 5A.

With reference to FIGS. 1A-6F, the back plate 650 may include a first side 656a, a second side 656b, a top side 652, and a bottom side 654. The bottom side 654 may be coupled to a base plate (e.g., the base plate 502), as described. The first side 656a may be coupled to a portion of an end plate (e.g., the portion 632 of the end plate 620) such that the end plate is substantially perpendicular to the first side 656a. In such embodiments, the back plate 650 may be reinforced by the end plate, as described (see, e.g., FIG. 5A).

In some embodiments, a portion 659 of the back plate 650 may be angled about an axis 658 such that the portion 659 of the back plate 650 is angled towards the back of the base plate (see FIG. 7). In such embodiments, the portion 659 may be angled to conform to a tapered side of an end plate (e.g., the tapered side 628 of the end plate 620) and/or the tapered side of an interior plate (e.g., the tapered side 608 of the interior plate 600). By angling the portion 659 of the back plate 650, the back plate 650 may provide greater clearance for a foot of a tripod (e.g., the foot 202a of the tripod 200) that is in contact with the back plate 650, especially in situations in which the tripod is tilted back towards the portion 659 of the back plate 650 (see, e.g., FIG. 4C).

FIG. 7 illustrates a cross-sectional view of a bottom bracket 700 according to some embodiments. In some embodiments, the bottom bracket 700 may be similar to the bottom bracket 500 described with reference to FIG. 5A. Thus, with reference to FIGS. 1A-7, the bottom bracket 700 may include the base plate 502, the front plate 640, the back plate 650, and the end plate 620, as described (see FIG. 5A-6F).

The front plate 640, the back plate 650, and the end plate 620 may be coupled together in a manner to form a gap 702 suitable for receiving a foot (or a portion of a foot) of a tripod (e.g., the foot 202a of the tripod 200). In some embodiment, the vertical profile (i.e., the height) of the front plate 640 may be less than the vertical profile of the back plate 650.

While a foot of the tripod is positioned in the gap 702, a forward movement of the foot of the tripod (i.e., toward the "FRONT" of the bottom bracket 700) may be obstructed by the front plate 640 and the end plate 620. Specifically, the lipped portion 638 of the end plate 620 and the front plate 640 may function as a physical barrier that secure the tripod foot within the gap 702. Similarly, a backwards movement of the foot of the tripod (i.e., towards the "BACK" of the base plate 502) may be limited/obstructed by the back plate 650. In such embodiments, once the foot of the tripod is positioned within the gap 702, the foot of the tripod may be securely coupled to the bottom bracket 700 (which is coupled to a hand truck, such as the hand truck 300), thereby enabling the tripod to be moved safely with a reduced risk of sliding off the hand truck or the bottom bracket 700.

In some embodiments, the foot of the tripod may be in contact with the top side 624 of the end plate 620 while the foot of the tripod is positioned within the gap 702. As a result, the foot of the tripod may rest on the bottom bracket 500 with a certain clearance 704 above the base plate 502. Because of the clearance 704 above the base plate 502, the tripod may be pivoted back towards the hand truck with a reduced risk of binding or catching on the ground, the base plate 502, and/or the ledge of the hand truck (see, e.g., FIG. 4C).

FIGS. 8A-8C illustrate a front view, a top view, and a cross-sectional view, respectively, of a top bracket 800 configured to receive a central post of a tripod (e.g., the central post 208 of the tripod 200 of FIGS. 2-4C), according to various embodiments. In some embodiments, the top bracket 800 may be similar to the top bracket 304 of FIGS. 3A-4C.

With reference to FIGS. 1A-8A, the top bracket 800 may include a base portion 802 that may be coupled to a hand truck (e.g., the hand truck 300) via attachment points 803a, 803b. For example, the attachment points 803a, 803b may be configured to receive bolts, screws, etc. that may be used to couple the base portion 802 with the frame body 102 and/or the support bar 110a of the hand truck 300 (see FIG. 3). The top bracket 800 may also include an protruding portion 804 that extends away from the base portion 802 of the top bracket 800, such as is illustrated in FIG. 8B.

With reference to FIGS. 1A-8B, the protruding portion 804 may include coupling points 808a, 808b that may be configured to receive a restraint. For example, the coupling points 808a, 808b may be key-slot holes configured to receive and secure a chain restraint 332.

The protruding portion 804 may include a first side 807a and a second side 807b, each of which may be tapered towards a center line 810 of the protruding portion 804 to reduce the overall weight of the top bracket 800. In some alternative embodiments, rather than including tapered sides 807a, 807b, the protruding portion 804 may include sides with various other shapes, such as rectangular sides 809a, 809b.

The protruding portion 804 may include a cutout section 806 configured to receive a central post of a tripod (e.g., the central post 208 of the tripod 200 of FIG. 2). The shape of the cutout section 806 may be rounded as illustrated. In some embodiments (not shown), the cutout section 806 may be configured to have various other shapes suitable for receiving central posts of varying shapes. For example, the cutout section 806 may have a rectangular, trapezoidal, elliptical, etc. shape in order to receive a central post with a corresponding shape (e.g., rectangular, hexagonal, and elliptical/circular).

With reference to FIGS. 1A-8C, the protruding portion 804 may be coupled to the base portion 802 such that the portions 802, 804 are substantially perpendicular to each other (see FIG. 8C). Further, the attachment points 803a, 803b of the base portion 802 may be offset from the protruding portion 804 to enable coupling mechanisms (e.g., bolts, screws, etc.) to be used to attach the base portion 802 to the hand truck, as described.

FIG. 9A illustrates a cross-sectional, overhead view of a base of a conventional tripod 900 that may be similar to the tripod 200 of FIG. 2. With reference to FIGS. 1A-9A, the tripod base 900 includes three feet: a first foot 902a, a second foot 902b, and a third foot 902c. The feet 902a-902c each include hollowed-out portions 905a-905c, respectively. The feet 902a-902c also include edges or "lipped" portions 904a-904c, respectively, that support the tripod base 900 while the tripod base 900 is standing upright. The tripod base 900 includes a solid center portion 910, such as a central post of the tripod base 900 (not shown).

The first foot 902a and the second foot 902b form a first angle 908a, the second foot 902b and the third foot form a second angle 908b, and the first foot 902a and the third foot 902c form a third angle 908c. The first, second, and third angles 908a-908c add up to 360 degrees, and each of the angles 908a-908c is typically obtuse (e.g., 120 degrees). However, any combination of angles (e.g., right, acute and obtuse) may be implemented on a conventional tripod so long as the sum of the angles 908a-908c equals 360 degrees.

FIG. 9B illustrates a cross-sectional, overhead view of another conventional tripod base 930. With reference to FIGS. 1A-9B and as described (see FIG. 9A), the tripod base 930 may include the feet 932a-932c, which are configured with hollowed-out portions 935a-935c and lipped portions 934a-934c, as described. The conventional tripod base 930 may not include a solid center portion (e.g., the solid center portion 910 of the tripod base 900), and thus the hollowed-out portions 935a-935c form a single large cavity in the tripod base 930. The feet 932a-932c of the tripod base 930 also form angles 938a-938c that add up to 360 degrees, as described.

FIG. 10A illustrates an overhead view of a system 1000 that includes the conventional tripod base 930 of FIG. 9B coupled to a bottom bracket 1002, according to some embodiments. The bottom bracket 1002 may be similar to the bottom bracket 302, 500, 550, 700. With reference to FIGS. 1A-10A, the bottom bracket 1002 may include a front plate 1004, a back plate 1006, a first end plate 1010a, and a second end plate 1010b. The plates 1004, 1006, 1010a, 1010b may be coupled to a base plate 1003, as described (see, e.g., FIGS. 5-7).

In some embodiments, the front plate 1004 and the back plate 1006 may each be formed as a single plate or as multiple plates joined together at an angle about a center line 1012 of the bottom bracket 1002. The front plate 1004 and the back plate 1006 may each be coupled to the end plates 1010a-1010b.

A gap 1007 may be formed between the front plate 1004 and the back plate 1006, as described. For ease of description, the gap 1007 may be referred to as having a first portion 1008a to one side of the center line 1012 and a second portion 1008b to the other side of the center line 1012.

As described (see FIG. 9B), the tripod base 930 may include the first foot 932a, the second foot 932b, and the third foot 932c. Each of the feet 932a-932c may include, respectively, the hollowed-out portions 935a-935c, as well as the lipped portions 934a-934c that border the hollowed-out portions 935a-935c.

In some embodiments, the first portion 1008a of the gap 1007 may be configured to receive a portion of a foot of the tripod (e.g., the third foot 906c). For example, as illustrated, the third foot 906c may be placed in the first portion 1008a of the gap 1007 such that some of the lipped portion 934c of the third foot 906c may be positioned in the first portion 1008a of the gap. In some embodiments, a part of the lipped portion 904c may contact (e.g., rest on top of) the end plate 1010a.

The second portion 1008b of the gap 1007 may be configured to receive a portion of another foot of the tripod (e.g., the second foot 906b) in a similar manner. For example, the second portion 1008b of the gap 1007 may be configured to receive part of the lipped portion 904b of the second foot 902b such that the lipped portion 904b is positioned between the front plate 1004 and the back plate 1006. In some embodiments, the lipped portion 904b may contact (e.g., rest on top of) the end plate 1010 (see, e.g., FIG. 7). Further, as described, the feet 932b-932c may be in contact with (i.e., rest against) the back plate 1006, such as when the tripod base 930 is tipped back in the bottom bracket 1002.

In some embodiments (not shown), the front plate 1004 and the back plate 1006 may be coupled to one or more interior plates configured to provide additional structural support to the front plate 1004 and/or the back plate 1006, as described.

FIG. 10B illustrates an overhead view of a system 1030 that includes the conventional tripod base 900 of FIG. 9A coupled to a bottom bracket 1032, according to some embodiments. With reference to FIGS. 1A-10B, the bottom bracket 1032 may include a first front plate 1034a, a second front plate 1034b, a first back plate 1036a, and a second back plate 1036b. The bottom bracket 1032 may also include a first end plate 1040a, a second end plate 1040b, a first interior plate 1044a, and a second interior plate 1044b. The plates 1034a, 1034b, 1036a, 1036b, 1040a, 1040b, and 1044a, 1044b may be coupled to a base plate 1033, as described (see, e.g., FIGS. 5-7).

As described (see, e.g., FIG. 9A), the tripod base 900 may include a first foot 902a, a second foot 902b, and a third foot 902c, and each of the feet 902a-902c may include the hollowed-out portions 905a-905c, as well as the lipped portions 904a-904c. The tripod may include a solid center portion 910 that may separate the hollowed-out portions 905a-905c.

The bottom bracket 1032 may include a first gap 1038a formed between the first front plate 1034a and the first back plate 1036a and a second gap 1038b formed between the second front plate 1034b and the second back plate 1036b. Each of the first gap 1038a and the second gap 1038b each may be configured to receive a portion of a foot of the tripod base 900. For example, the first gap 1038a may be configured to receive part of the third foot 902c (e.g., at least a part of the lipped portion 904c) such that that part of the lipped portion 904c may be positioned between the first front plate 1034a and the first back plate 1036a. Similarly, in another example, the second gap 1038 may be configured to receive part of the second foot 902b (e.g., at least a part of the lipped portion 904b) such that the received part of the second foot 902b is positioned between the second front plate 1034b and the second back plate 1036b.

In some embodiments, while received in the first gap 1038a, the lipped portion 904c may be in contact with (e.g., rest on top of) the first end plate 1040a and/or the first interior plate 1044a (see, e.g., FIGS. 6A-7). Similarly, the lipped portion 904b may be in contact with (e.g., rest on top of) the second end plate 1040b and/or the second interior plate 1044b. In such embodiments, by being in contact with the end plates 1040a, 1040b and/or the interior plates 1044a, 1044b, the feet 902b-902c of the tripod base 900 may be supported on the bottom bracket 1032 while maintaining a certain clearance above the base plate 1033 (e.g., the clearance 704 of FIG. 7).

FIG. 10C illustrates an overhead view of a system 1060 that includes the conventional tripod base 930 of FIG. 9B coupled to a bottom bracket 1062, according to various embodiments. With reference to FIGS. 1A-10C, the bottom bracket 1062 may include a first front plate 1064a, a second front plate 1064b, a first back plate 1066a, and a second back plate 1066b. The bottom bracket 1062 may also include a first end plate 1070a, a second end plate 1070b, a first interior plate 1074a, and a second interior plate 1074b. The plates 1064a, 1064b, 1066a, 1066b, 1070a, 1070b, and 1074a, 1074b may be coupled to a base plate 1063, as described (see, e.g., FIGS. 5-7). As described (see, e.g., FIG.

9B), the tripod base 930 may include the first foot 932a, the second foot 932b, and the third foot 932c.

The bottom bracket 1062 may include a first gap 1068a formed between the first front plate 1064a and the first back plate 1066a and a second gap 1068b formed between the second front plate 1064b and the second back plate 1066b. Each of the first gap 1068a and the second gap 1068b each may be configured to receive a portion of a foot of the tripod base 930. For example, the first gap 1068a may be configured to receive part of the third foot 902c such that the width of the third foot 902c may be positioned between the first front plate 1064a and the first back plate 1066a. In other words, rather than receiving only an edge of the third foot 902c (see, e.g., FIGS. 10A-10B), the first gap 1068a may hold the width of the third foot 902c. Similarly, in another example, the second gap 1068 may be configured to receive part of the second foot 902b such that the received part of the second foot 902b is positioned between the second front plate 1064b and the second back plate 1066b.

In some embodiments, the portion of the third foot 902c received in the first gap 1068a may be in contact with (e.g., rest on top of) the first end plate 1070a and/or the first interior plate 1044a. Similarly, the portion of the second foot 902b received in the second gap 1068b may be in contact with (e.g., rest on top of) the second end plate 1070b and/or the second interior plate 1074b (see, e.g., FIGS. 6A-7). In such embodiments, by being in contact with the end plates 1070a, 1070b and/or the interior plates 1074a, 1074b, the feet 902b-902c of the tripod base 900 may be supported on the bottom bracket 1032 while maintaining a certain clearance above the base plate 1033 (e.g., the clearance 704 of FIG. 7).

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein. Further, any reference to claim elements in the singular, for example, using the articles "a," "an," or "the" is not to be construed as limiting the element to the singular.

What is claimed is:

1. A bracket mounted on a hand truck for securing a tripod having a first foot, a second foot, and a third foot, the bracket comprising:
    a base plate;
    a ledge located on a back portion of the base plate;
    a front plate coupled to the base plate;
    a back plate coupled to the base plate, wherein a vertical profile of the back plate is higher than a vertical profile of the front plate; and
    a gap formed between the front plate and the back plate and configured to receive the first foot and the second foot of the tripod,
    wherein the front plate comprises a first portion and a second portion and wherein the first portion and the second portion are oriented to each other to form an obtuse angle having a vertex located distal from the ledge.

2. The bracket of claim 1, wherein:
    the back plate comprises a first back plate and a second back plate;
    a first portion of the gap is formed between the front plate and the first back plate and is configured to receive the first foot of the tripod; and
    a second portion of the gap is formed between the front plate and the second back plate and is configured to receive the second foot of the tripod.

3. The bracket of claim 1, wherein:
    the back plate comprises a first back plate and a second back plate;
    the front plate comprises a first front plate and a second front plate;
    a first portion of the gap is formed between the first front plate and the first back plate and is configured to receive the first foot of the tripod; and
    a second portion of the gap is formed between the second front plate and the second back plate and is configured to receive the second foot of the tripod.

4. The bracket of claim 1, wherein the front plate and the back plate are configured to limit movement of the first foot and the second foot while the first foot and the second foot are positioned within the gap between the front plate and the back plate.

5. The bracket of claim 1, wherein each of the front plate and the back plate is positioned on the bracket to form an obtuse angle.

6. The bracket of claim 1, wherein a portion of the back plate is configured to form an obtuse angle.

7. The bracket of claim 1, wherein:
    the front plate is positioned perpendicular to the base plate; and
    at least a portion of the back plate is positioned perpendicular to the base plate.

8. The bracket of claim 1, wherein the bracket is configured to receive the first foot and the second foot such that:
    a portion of the first foot is received in the gap between the front plate and the back plate; and
    a portion of the second foot is received in the gap between the front plate and the back plate.

9. The bracket of claim 8, wherein the front plate and the back plate are configured to limit movement of the first foot and the second foot while the portion of the first foot and the portion of the second foot are positioned within the gap between the front plate and the back plate.

10. The bracket of claim 1, further comprising:
    a first end plate coupled to the front plate and the back plate at a first end; and
    a second end plate coupled to the front plate and the back plate at a second end.

11. The bracket of claim 10, wherein:
    the first end plate comprises a first lipped portion configured to engage a portion of the first foot; and
    the second end plate comprises a second lipped portion configured to engage a portion of the second foot.

12. The bracket of claim 10, wherein:
    a first portion of the gap between the front plate and the back plate is configured to receive the first foot such that a first portion of the first foot contacts a top of the first end plate; and
    a second portion of the gap between the front plate and the back plate is configured to receive the second foot such that a first portion of the second foot contacts a top of the second end plate.

13. The bracket of claim 12, further comprising:
    a first interior plate coupled to the front plate and the back plate; and
    a second interior plate coupled to the front plate and the back plate.

14. The bracket of claim 13, wherein:
the first portion of the gap between the front plate and the back plate is configured to receive the first foot such that a second portion of the first foot contacts a top of the first interior plate; and
the second portion of the gap between the front plate and the back plate is configured to receive the second foot such that a second portion of the second foot contacts a top of the second interior plate.

15. A hand truck for securing a tripod having a first foot, a second foot, and a third foot, comprising:
a top bracket coupled to a body of the hand truck and configured to receive a post of the tripod;
a bottom bracket coupled to a ledge of the hand truck and configured to receive the first foot of the tripod and the second foot of the tripod, wherein the bottom bracket comprises:
a base plate;
a front plate coupled to the base plate;
a ledge located on a back portion of the base plate;
a back plate coupled to the base plate, wherein a vertical profile of the back plate is higher than a vertical profile of the front plate; and
a gap formed between the front plate and the back plate and configured to receive the first foot and the second foot,
wherein the front plate comprises a first portion and a second portion and wherein the first portion and the second portion are oriented to each other to form an obtuse angle having a vertex located distal from the ledge.

16. The hand truck of claim 15, wherein the front plate and the back plate are configured to limit movement of the first foot and the second foot while the first foot and the second foot are positioned within the gap between the front plate and the back plate.

17. The hand truck of claim 16, wherein the top bracket is positioned on the body of the hand truck such that the top bracket is able to receive the post of the tripod in a manner such that the post of the tripod is substantially parallel to the body of the hand truck while coupled to the top bracket.

18. The hand truck of claim 16, wherein the top bracket comprises a restraint configured to secure the post of the tripod to the body of the hand truck while the first foot and the second foot are positioned within the gap between the front plate and the back plate.

* * * * *